US012423395B2

(12) United States Patent
Tang et al.

(10) Patent No.: US 12,423,395 B2
(45) Date of Patent: Sep. 23, 2025

(54) ANTI-SPOOFING AUTHENTICATION SYSTEM

(71) Applicant: Himax Technologies Limited, Tainan (TW)

(72) Inventors: Ti-Wen Tang, Tainan (TW); Chin-Kuei Hsu, Tainan (TW); Ching-Han Chou, Tainan (TW); Bo-Ying Huang, Tainan (TW); Tzu-Hsu Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 292 days.

(21) Appl. No.: 18/211,944

(22) Filed: Jun. 20, 2023

(65) Prior Publication Data

US 2024/0427863 A1  Dec. 26, 2024

(51) Int. Cl.
*G06F 21/00* (2013.01)
*G06F 21/32* (2013.01)
*G06V 40/16* (2022.01)
*G06V 40/40* (2022.01)
*G10L 15/08* (2006.01)
*G10L 17/24* (2013.01)

(52) U.S. Cl.
CPC ............ *G06F 21/32* (2013.01); *G06V 40/161* (2022.01); *G06V 40/171* (2022.01); *G06V 40/172* (2022.01); *G06V 40/45* (2022.01); *G10L 15/08* (2013.01); *G10L 17/24* (2013.01); *G06F 2221/2103* (2013.01); *G10L 2015/088* (2013.01)

(58) Field of Classification Search
CPC ............ G06F 21/32; G06F 2221/2103; G06V 40/161; G06V 40/171; G06V 40/172; G06V 40/45; G06V 40/40; G10L 15/08; G10L 17/24; G10L 2015/088
See application file for complete search history.

(56) References Cited

U.S. PATENT DOCUMENTS

| 11,397,799 | B2 * | 7/2022 | Lawrenson | G06F 21/31 |
| 2018/0239955 | A1 * | 8/2018 | Rodriguez | G06V 40/171 |
| 2020/0097643 | A1 * | 3/2020 | Uzun | G06V 40/40 |
| 2020/0218916 | A1 * | 7/2020 | Wu | G06V 40/40 |
| 2021/0320801 | A1 * | 10/2021 | Wyss | G06V 40/171 |

* cited by examiner

Primary Examiner — William A Corum, Jr.
(74) Attorney, Agent, or Firm — Stout, Uxa & Buyan, LLP; Donald E. Stout

(57) ABSTRACT

An anti-spoofing authentication system includes an image capture device that converts received light into an image signal representing a captured image; a microphone that converts sound wave into a voice signal; a face detection device that detects a human face on the captured image, the face detection device including a lip detection device that detects lip features associated with the detected human face; a voice activity detection (VAD) device that detects presence of human voice in the voice signal; and an anti-spoofing device that detects a spoofing attack according to the detected lip features and the detected human voice.

16 Claims, 5 Drawing Sheets

ANTI-SPOOFING AUTHENTICATION SYSTEM

BACKGROUND OF THE INVENTION

1. Field of the Invention

The present invention generally relates to an authentication system, and more particularly to an anti-spoofing authentication system.

2. Description of Related Art

Computer security, cyber security or information technology security is the protection of computer systems and networks from attack by malicious actors that may result in unauthorized information disclosure, theft of, or damage to hardware, software, or data.

This field has become of significance due to the expanded reliance on computer systems, the Internet and wireless network standards such as Bluetooth and Wi-Fi, and due to the growth of smart devices, including smartphones, televisions, and the various devices that constitute the Internet of things (IoT).

Various authentication methods can be used to authenticate a user's identify ranging from a password to higher levels of security such as biometric authentication, which is the use of unique physical attributes and body measurements as the intermediate for better identification and access control. Physical characteristics that are often used for authentication include fingerprints, voice recognition, face recognition and iris scans which are unique to every individual.

Anti-spoofing is important in authentication because it helps protect against fraud and identify theft such as image spoofing. There are several ways to prevent image spoofing. A common method for detecting face spoofing attacks is to analyze the depth data obtained by a depth camera. This data represents the distance of each pixel from the camera. By comparing the depth data of a captured face with that of a real face, the system can determine whether the face is genuine or not. A real face will have a consistent and smooth depth profile, while a spoofed face will have irregularities and discontinuities in the depth data. Therefore, if the depth data of the face matches with that of a real face, the system accepts it as authentic, otherwise it rejects it as fake.

Generally speaking, liveness detection is a process performed to detect a presentation attack by verifying the source of a biometric sample and its critical features, capable of deciding whether it is a live person present at the point of capture or a spoof such as a silicon mask, a photo or video.

Liveness detection is a crucial component of biometric systems that aims to prevent spoofing attacks by verifying the authenticity and vitality of a biometric sample. A spoofing attack occurs when an impostor presents a fake or altered biometric characteristic, such as a silicone mask or finger, a photo or a video, to deceive the system and gain unauthorized access or benefits. Liveness detection algorithms analyze the biometric data collected by the sensors and determine whether they originate from a live person who is present at the time of capture or from a suspicious presentation that could undermine the intended policy of the system.

The conventional authentication systems have several limitations that compromise their security and usability. For example, they may rely on passwords that are easy to forget or guess, biometric features that are vulnerable to spoofing or theft, or tokens that are inconvenient to carry or prone to loss. A need has thus arisen to propose a novel scheme to overcome drawbacks of the conventional authentication systems.

SUMMARY OF THE INVENTION

In view of the foregoing, it is an object of the embodiment of the present invention to provide an anti-spoofing authentication system capable of preventing spoofing attacks.

According to one embodiment, an anti-spoofing authentication system includes an image capture device, a microphone, a face detection device, a voice activity detection (VAD) device and an anti-spoofing device. The image capture device converts received light into an image signal representing a captured image, The microphone converts sound wave into a voice signal. The face detection device detects a human face on the captured image, and the face detection device includes a lip detection device that detects lip features associated with the detected human face. The voice activity detection (VAD) device detects presence of human voice in the voice signal. The anti-spoofing device detects a spoofing attack according to the detected lip features and the detected human voice.

DETAILED DESCRIPTION OF THE INVENTION

Figure 1:
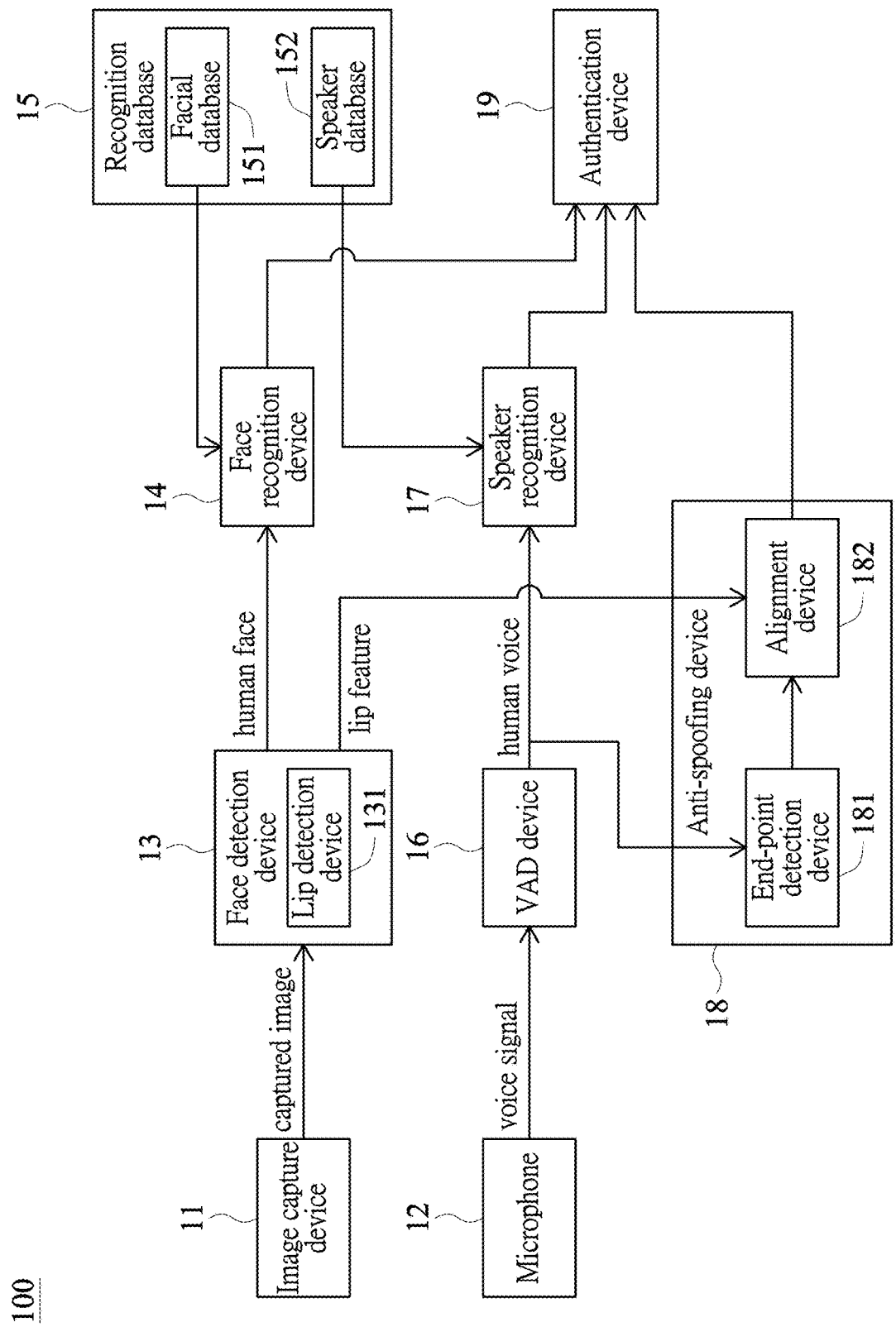
FIG. 1 shows a block diagram illustrating an anti-spoofing authentication system according to one embodiment of the present invention.

FIG. 1 shows a block diagram illustrating an anti-spoofing authentication system 100 according to one embodiment of the present invention. The anti-spoofing authentication system 100 ("authentication system" hereinafter) with liveness detection in the embodiment is capable of preventing spoofing attacks to ensure that the user is a real person but not a fake photograph or voice.

Specifically, the authentication system 100 of the embodiment may include an image capture device 11, such as an image sensor or a digital camera made of charge-coupled device (CCD) or complementary metal-oxide-semiconductor (CMOS) image sensor, configured to convert received light into an (electrical) image signal representing a captured image. The authentication system 100 of the embodiment may include a microphone 12 configured to convert sound wave into an (electrical) voice signal.

Figure 2:
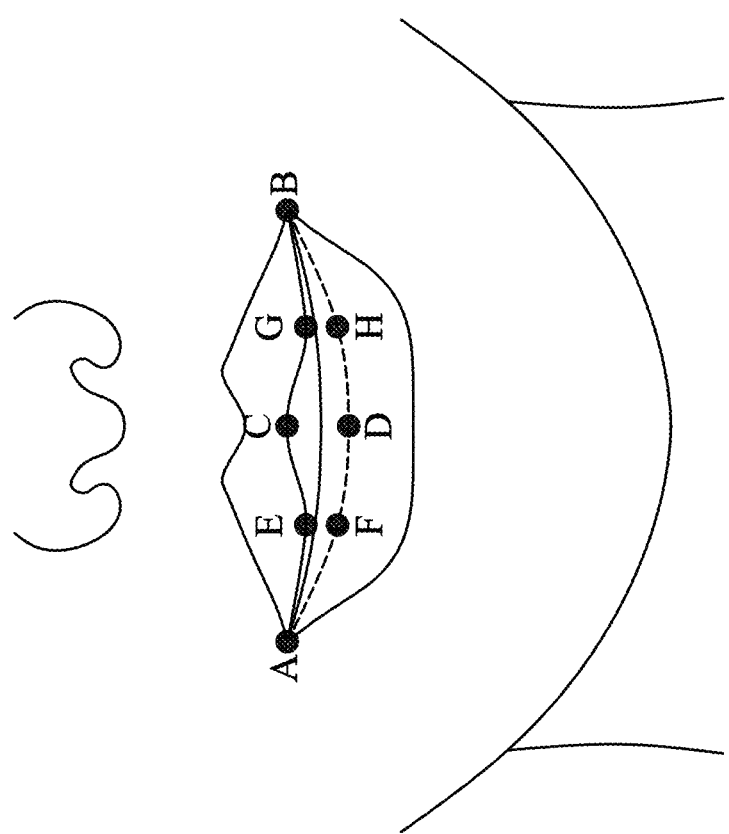
FIG. 2 shows a schematic diagram exemplifying lips with key points representing the lip feature.

In the embodiment, the authentication system 100 may include a face detection device 13 configured to detect (and localize) a human face on the captured image. According to one aspect of the embodiment, the face detection device 13 may include a lip detection device 131 (that is a specific case of facial landmark detection) configured to detect (and localize) lip features associated with the detected human face. Specifically speaking, the lip feature may be represented by key points (of lips) that mark contours and curves of the lip feature. A set of key points may be assigned to upper and lower lips to capture the essential information about the lip feature, such as its size, position, orientation, and curvature. FIG. 2 shows a schematic diagram exemplifying lips with key points representing the lip feature.

The authentication system 100 may further include a face recognition device 14 configured to identify the detected human face by matching (an extracted feature of) the detected human face with a facial database 151 of pre-stored (extracted features of) human faces in a recognition database 15, for example, from enrolled or registered users.

In the embodiment, the authentication system 100 may include a voice activity detection (VAD) device 16 configured to detect presence or absence of human voice in the voice signal. The authentication system 100 may further include a speaker recognition device 17 configured to identify a speaker by matching (an extracted feature of) the detected human voice with a speaker database 152 of pre-stored (extracted features of) human voices in the recognition database 15.

According to another aspect of the embodiment, the authentication system 100 may include an anti-spoofing device 18 configured to detect a spoofing attack according to the detected lip features (from the lip detection device 131) and the detected human voice (from the VAD device 16).

Figure 3:
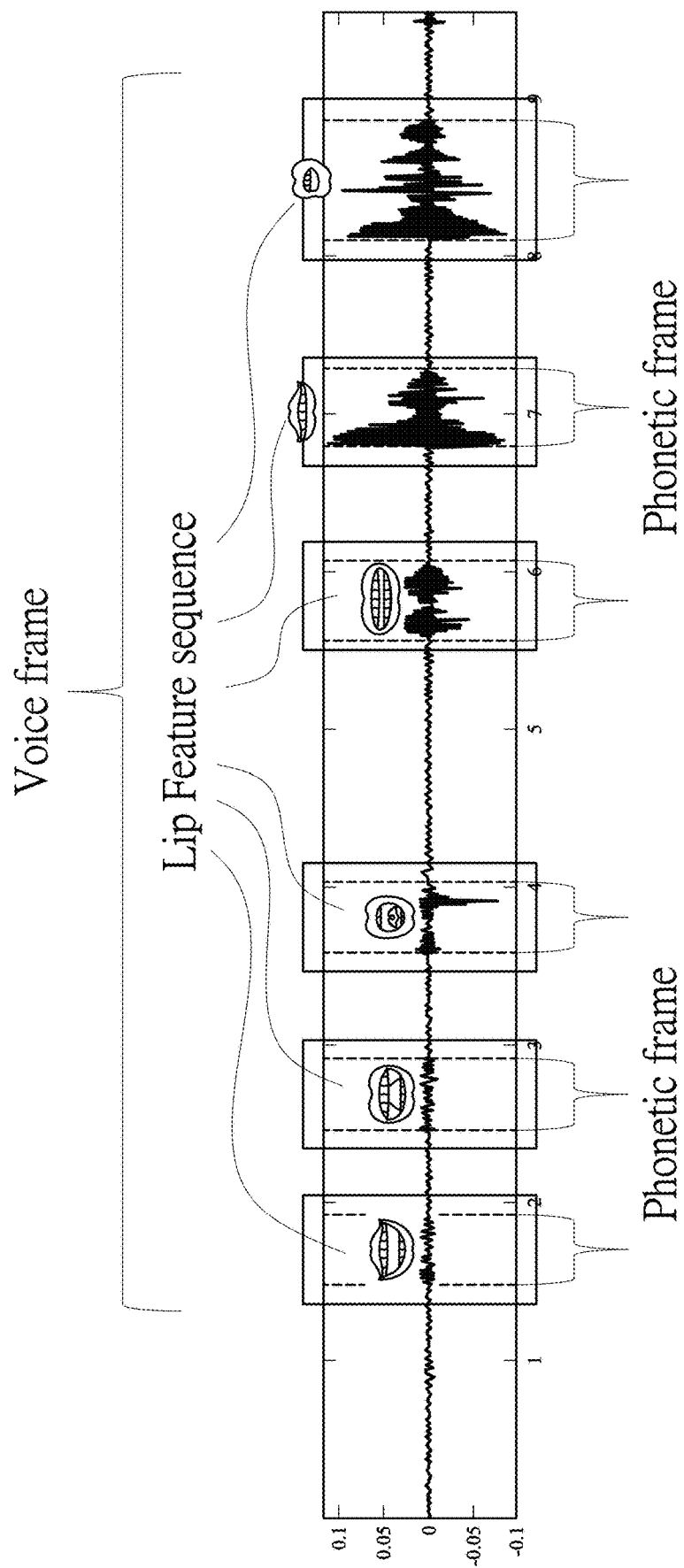
FIG. 3 shows waveform of an exemplary voice frame (or voice signal) with voice segments (or phonetic frames) framed by corresponding beginning points and end points indicated by dashed lines.

Specifically, the anti-spoofing device 18 may include an end-point detection device 181 configured to detect beginning points and end points of corresponding voice segments (or phonetic frames) in the detected human voice (from the VAD device 16). FIG. 3 shows waveform of an exemplary voice frame (or voice signal) with voice segments (or phonetic frames) framed by corresponding beginning points and end points indicated by dashed lines.

The anti-spoofing device 18 may include an alignment device 182 configured to determine whether the voice segments framed by corresponding beginning points and end points are positioned temporally in alignment with lip features. If the voice segments are positioned in alignment with the lip features as exemplified in FIG. 3, liveness detection is affirmed, otherwise the authentication system 100 may probably be under attack with false identification.

The authentication system 100 of the embodiment may include an authentication device 19 configured to verify identity of a user under authentication according to results of the face recognition device 14, the speaker recognition device 17 and the anti-spoofing device 18. In one exemplary embodiment, authentication is affirmed when the detected human face is identified by the face recognition device 14, the speaker is identified by the speaker recognition device 17, and no spoofing attack is detected by the anti-spoofing device 18.

Figure 4:
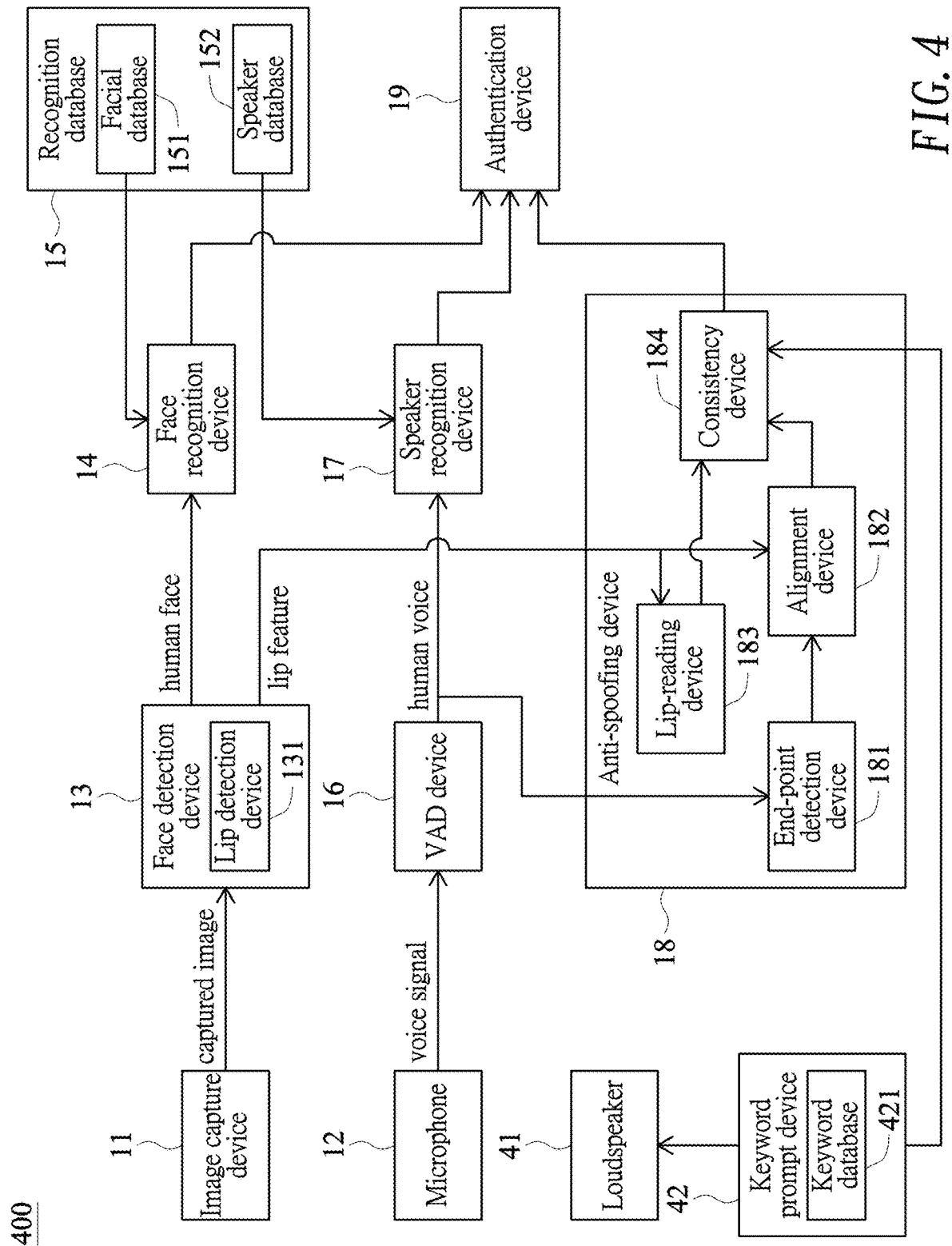
FIG. 4 shows a block diagram illustrating an anti-spoofing authentication system according to another embodiment of the present invention.

FIG. 4 shows a block diagram illustrating an anti-spoofing authentication system 400 according to another embodiment of the present invention. The anti-spoofing authentication system 400 ("authentication system" hereinafter) is similar to the authentication system 100 of FIG. 1 with the following exceptions.

In the embodiment, the authentication system 400 may include a loudspeaker 41 configured to convert an (electrical) audio signal into sound wave. The authentication system 400 may further include a keyword prompt device 42 (which can access a keyword database 421) coupled to the loudspeaker 41 and configured to prompt a user to speak a keyword.

According to one aspect of the embodiment, the anti-spoofing device 18 may further include a lip-reading device 183 configured to interpret a lip movement according to the detected lip features (from the lip detection device 131) as prompted by the keyword prompt device 42. Details of lip-reading may be referred to "Training Strategies for Improved Lip-Reading" by Pingchuan Ma et al. and "Accurate and Resource-Efficient Lipreading with Efficientnetv2 and Transformers" by Alexandros Koumparoulis, which are incorporated herein by reference.

The anti-spoofing device 18 may further include a consistency device 184 configured to determine whether the prompted keyword is in consistency with the interpreted lip movement (from the lip-reading device 183), when the alignment device 182 determines that the voice segments are positioned temporally in alignment with lip features. If the prompted keyword is in consistency with the interpreted lip movement, liveness detection is affirmed, otherwise the authentication system 400 may probably be under attack with false identification. In one embodiment, before performing consistency determination, the voice segments in the detected human voice and the prompted keywords are transcribed into an alphabetic system of phonetic notation, such as International Phonetic Alphabet (IPA). This allows the system to compare the voice segments and the prompted keywords based on their pronunciation rather than their spelling.

Figure 5:
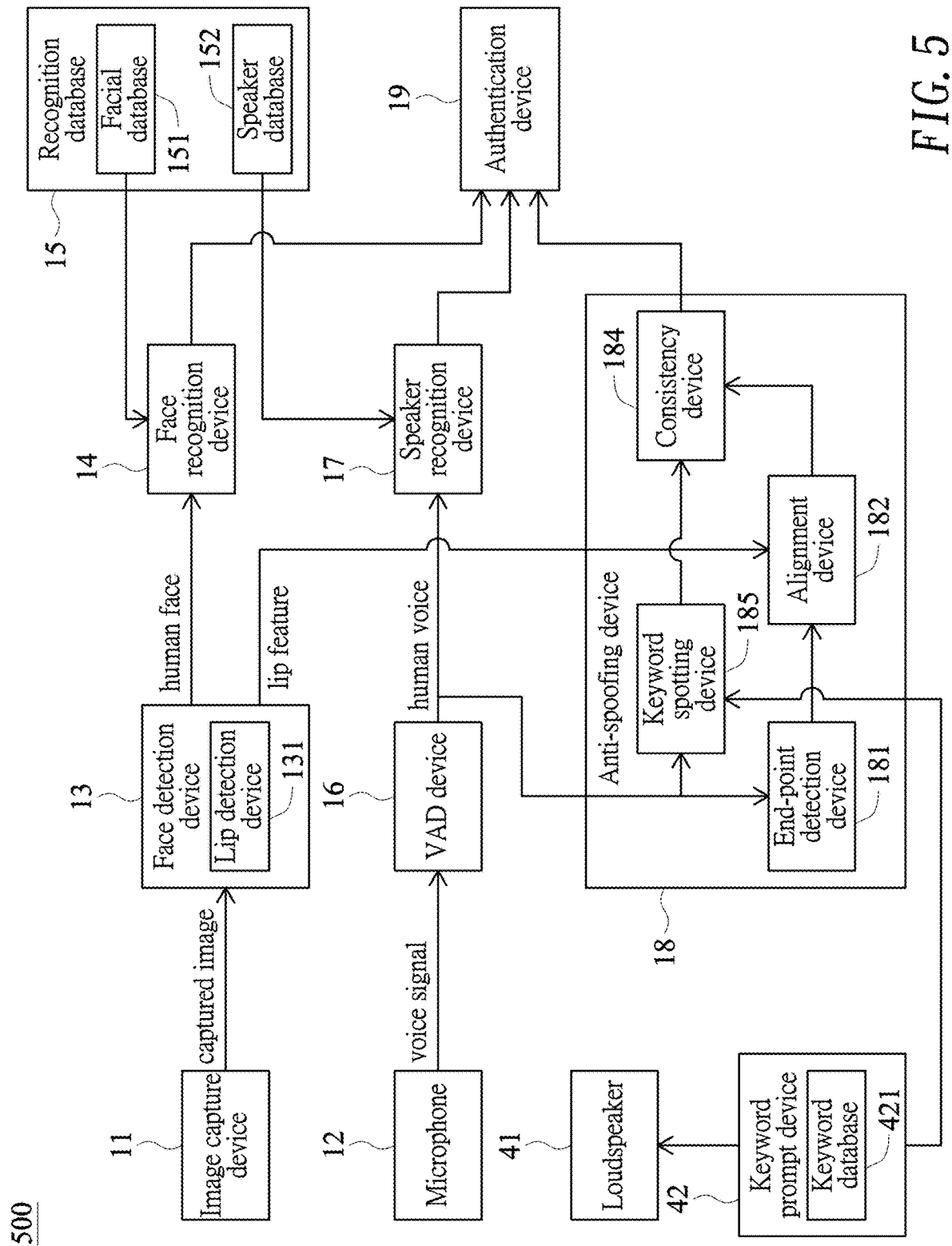
FIG. 5 shows a block diagram illustrating an anti-spoofing authentication system according to a further embodiment of the present invention.

FIG. 5 shows a block diagram illustrating an anti-spoofing authentication system 500 according to a further embodiment of the present invention. The anti-spoofing authentication system 500 ("authentication system" hereinafter) is similar to the authentication system 400 of FIG. 4 with the following exceptions.

In the embodiment, the lip-reading device 183 (of the authentication system 400 of FIG. 4) is replaced with a keyword spotting device 185, configured to detect presence of the prompted keyword (as prompted by the keyword prompt device 42) in the human voice. The keyword spotting device 185 may adopt conventional keyword spotting techniques, details of which are omitted for brevity.

In the embodiment, the consistency device 184 determines that the prompted keyword is present when the keyword spotting device 185 detects the presence of the prompted keyword in the human voice and when the alignment device 182 determines that the voice segments are positioned temporally in alignment with lip features. If the prompted keyword is present (as determined by the consistency device 184), liveness detection is affirmed, otherwise the authentication system 500 may probably be under attack with false identification.

Although specific embodiments have been illustrated and described, it will be appreciated by those skilled in the art that various modifications may be made without departing from the scope of the present invention, which is intended to be limited solely by the appended claims.

What is claimed is:

1. An anti-spoofing authentication system, comprising:
   an image capture device that converts received light into an image signal representing a captured image;
   a microphone that converts sound wave into a voice signal;
   a face detection device that detects a human face on the captured image, the face detection device including a lip detection device that detects lip features associated with the detected human face;
   a voice activity detection (VAD) device that detects presence of human voice in the voice signal; and an anti-spoofing device that detects a spoofing attack according to the detected lip features and the detected human voice;
wherein the anti-spoofing device comprises:
an end-point detection device that detects beginning points and end points of corresponding voice segments in the detected human voice; and
an alignment device that determines whether the voice segments framed by corresponding beginning points and end points are positioned temporally in alignment with the detected lip features;
wherein the spoofing attack is not detected when the voice segments are positioned temporally in alignment with the detected lip features.

2. The system of claim 1, wherein each lip feature is represented by key points of lips that mark contours and curves of the lip feature.

3. The system of claim 1, further comprising:
a facial database pre-storing human faces; and
a face recognition device that identifies the detected human face by matching the detected human face with the pre-stored human faces of the facial database.

4. The system of claim 3, further comprising:
a speaker database pre-storing human voices; and
a speaker recognition device that identifies a speaker by matching the detected human voice with the human voices of the speaker database.

5. The system of claim 4, further comprising:
an authentication device that verifies identity of a user under authentication according to results of the face recognition device, the speaker recognition device and the anti-spoofing device.

6. The system of claim 5, wherein authentication is affirmed when the detected human face is identified by the face recognition device, the speaker is identified by the speaker recognition device, and no spoofing attack is detected by the anti-spoofing device.

7. The system of claim 1, further comprising:
a keyword prompt device that accesses a keyword database to prompt a user to speak a keyword.

8. The system of claim 7, further comprising:
a loudspeaker coupled to the keyword prompt device and configured to convert an audio signal into sound wave.

9. The system of claim 7, wherein the anti-spoofing device further comprises:
a lip-reading device that interprets a lip movement according to the detected lip features as prompted by the keyword prompt device.

10. The system of claim 9, wherein the anti-spoofing device further comprises:
a consistency device that determines whether the prompted keyword is in consistency with the interpreted lip movement.

11. The system of claim 10, wherein liveness detection is affirmed if the prompted keyword is in consistency with the interpreted lip movement, when the alignment device determines that the voice segments are positioned temporally in alignment with the lip features.

12. The system of claim 10, wherein the voice segments in the detected human voice and the prompted keywords are transcribed into an alphabetic system of phonetic notation before performing consistency determination.

13. The system of claim 12, wherein the alphabetic system of phonetic notation comprises International Phonetic Alphabet (IPA).

14. The system of claim 7, wherein the anti-spoofing device further comprises:
a keyword spotting device that detects presence of a prompted keyword in the detected human voice.

15. The system of claim 14, wherein the anti-spoofing device further comprises:
a consistency device that determines that the prompted keyword is present when the keyword spotting device detects the presence of the prompted keyword in the human voice and when the alignment device determines that the voice segments are positioned temporally in alignment with the lip features.

16. The system of claim 15, wherein liveness detection is affirmed if the prompted keyword is present, when the alignment device determines that the voice segments are positioned temporally in alignment with the lip features.

* * * * *